March 8, 1960
H. G. BUSIGNIES ET AL
2,927,501
ELECTRONIC SPECTROANALYZER SYSTEMS
Filed March 13, 1956
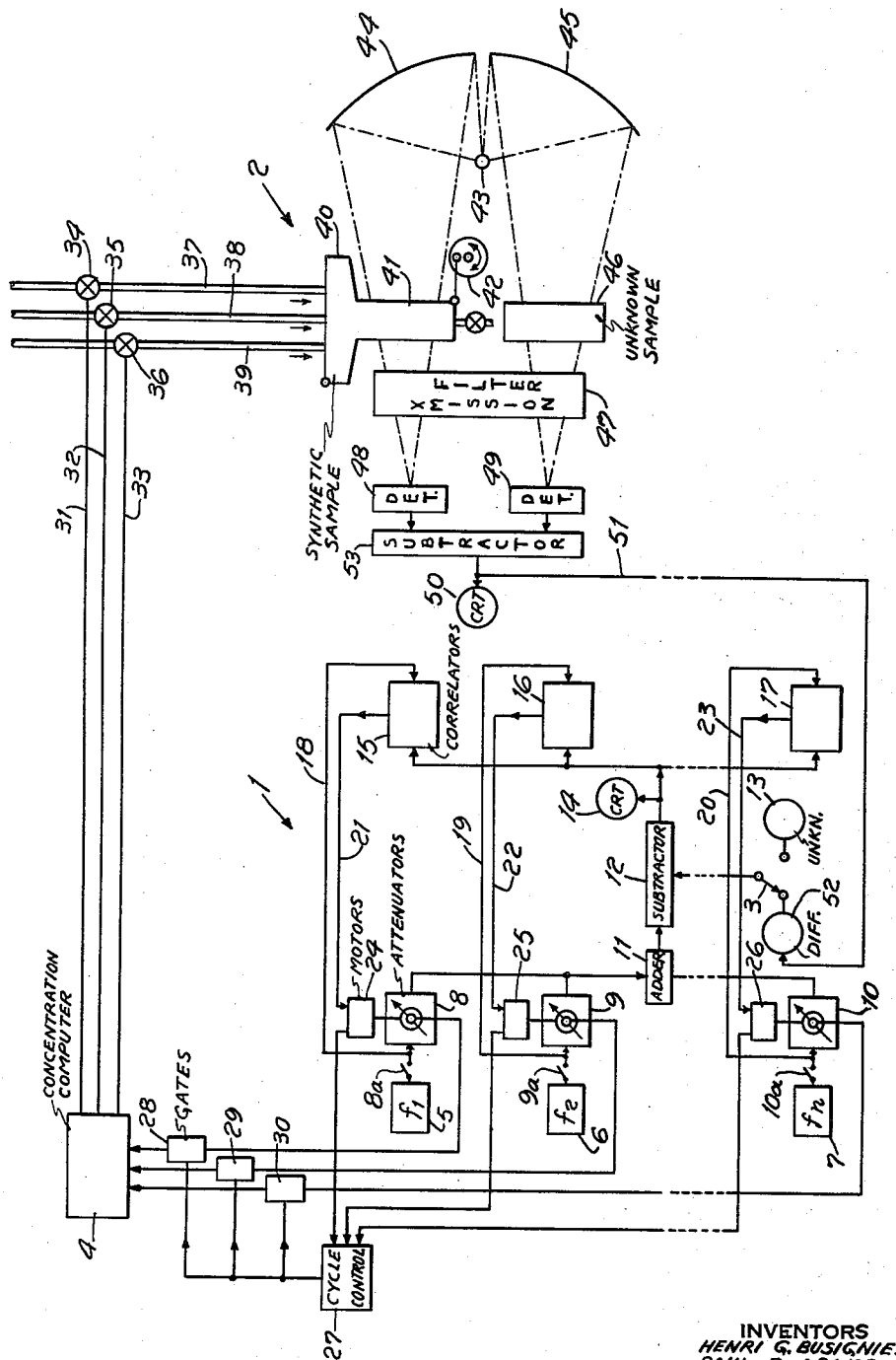
INVENTORS
HENRI G. BUSIGNIES
PAUL R. ADAMS
MORTIMER ROGOFF
BY
*Percy P. Lantzy*
ATTORNEY

2,927,501

ELECTRONIC SPECTROANALYZER SYSTEMS

Henri G. Busignies, Montclair, Paul R. Adams, Mountain Lakes, and Mortimer Rogoff, Nutley, N.J., assignors to International Telephone and Telegraph Corporation, Nutley, N.J., a corporation of Delaware Application March 13, 1956, Serial No. 571,270

8 Claims. (Cl. 88—14)

This invention relates to spectroanalyzer systems for analyzing chemical compounds and mixtures and, more particularly, to spectroanalyzing methods and apparatus which overcome inherent nonlinearities in spectroanalytical equipment and the nonlinearity that may be present in the behavior of the chemical constituents contained in the compound or mixture.

In recent years, the absorption by compounds of infrared energy at various points in the spectrum has been used for analytical purposes. In spite of the valuable information which can be obtained by the measurement of the infrared absorption of a sample, the use of this analytical tool has been greatly restricted due to certain practical difficulties. The infrared-absorption characteristic is determined by a spectrogram which is a graph of the percent of infrared radiation transmitted by the sample compound plotted against the wavelength of the radiation and normally shows several bands of relatively high infrared absorption which are characteristic of the atomic masses, the atomic bonds and the molecular configuration in space of the sample being analyzed. While no two compounds have identical spectrograms, it is probable that the spectrograms of many related compounds have similarities including one or more similar absorption bands which coincide or partially overlap. Furthermore, the mean breadth of each absorption band, or, in other words, the frequency width of the spectrogram peak, increases as the quantity of the sample in the path of the radiation is increased thus increasing the amount of overlap between absorption bands. One of the greatest difficulties presenting itself to the analyst is that the spectrograms of the individual constituents of a sample compound do not always add up in a truly linear manner to produce the spectrogram of the compound. Thus, the analyst must generally utilize a technique in order to determine the contents of the sample when the nonlinear behavior becomes troublesome. One technique heretofore utilized by those skilled in the art of spectroanalysis has been to eliminate from consideration that portion of the unknown spectrogram which is known to contain severe nonlinear behavior. Obviously, this entails some loss of information, but this loss normally is not serious since the elimination of a fraction only of the spectrum usually leaves sufficient data for reasonably accurate analysis. One alternate method of analysis used in the prior art was to dilute the sample compound; but while this resulted in a reduction of the nonlinear effects, it limited the accuracy since the dilution reduced the magnitude of the absorption spectrogram to the point where instrumental noise and inherent inaccuracies of the spectrophotometer became appreciable.

A second class of nonlinear effects not due to the chemical effects of the compound is brought about by the inherent noise of the instruments used in the analysis. Thus, there are many instances where the simple methods used to overcome or to compensate for the known nonlinear effects are not effective; and thus, a different analytical system and/or process is required which is capable of taking into account or removing from the analytical results these nonlinear effects.

One of the properties of conventional spectroanalysis is the lack of discrimination against nonlinear behavior of the elements in a chemical mixture, since the spectrogram of a chemical mixture contains the obscuring effects of the nonlinear behavior of its own constituents. It cannot be otherwise for the spectrogram merely relates in its own terms the occurrences of combination effects when various constituents are mixed together. If such a spectrogram is used as the basis for analysis, then it is clear that no linear combination of reference absorbance spectra can successfully match the absorbance spectrogram of the mixture. Thus, if extremely accurate analyses are to be established, some steps must be taken to include the effects of the nonlinear behavior within the data used for the calculation.

One of the objects of this invention is to provide a method and means for determining substantially the true ratio of the constituents in a chemical compound or mixture even though the combined constituents thereof involve a nonlinear behavior.

Another object is to provide an electronic spectroanalyzer system capable of analyzing chemical compounds or mixtures with a high degree of accuracy regardless of nonlinearities in the equipment of the system and nonlinearity behavior between constituents of the chemical compound or mixture.

One of the features of the invention involves the provision of an electronic spectroanalyst computer which analyzes an unknown mixture in terms of the linear combination of its constituent reference absorbance spectra. The linear ratio of the constituents thus obtained does not account for nonlinearity of equipment or nonlinearity of behavior in the combination of the constituents. These nonlinearities, however, are overcome or greatly minimized by synthesizing a sample of the ingredients according to the linear data obtained and comparing such sample with the unknown. This comparison is performed in a dual-beam spectrometer which provides a signal whose waveform represents a difference spectrum corresponding to the nonlinearities existing between the unknown and the linear ratios obtained by the computer. This difference spectrum signal is then applied to the computer for analysis. The computer operates with the difference spectrum signal to obtain correction values for the ratio of constituents obtained in the first analysis. When this operation is completed the correction values are applied to a concentration computer which computes and determines what quantities are to be added to the synthetic sample to correct its concentration. When this correction of concentration is obtained in the sample at the dual-beam spectrometer a new comparison with the unknown is obtained giving a new difference, if any, between the corrected synthetic sample and the unknown. This new correction if significant is applied again to the computer for analysis and when this is completed the concentration computer corrects the recorded ratios accordingly. This operation may be repeated should the first correction be insufficient to account for all nonlinearities present. By such corrective operation the nonlinearities which are not detected by the computer in its original linear analysis of the unknown are now determined, thus providing a highly accurate ratio indication of the constituents in the unknown.

The above-mentioned and other features and objects of this invention will become more apparent by reference to the following description taken in conjunction with the accompanying drawing, in which the single figure is a schematic diagram in block form of a spectroanalyzer system in accordance with the principles of this invention.

As illustrated, the electronic spectroanalyzing computer 1 is shown coupled to the output of a dual-beam spectrometer 2, by means of a switch 3. The output of the computer 1 is applied to a concentration computer 4 which in turn records and controls the preparation of a synthetic sample according to the computed concentration values of the constituents of the compound or mixture being analyzed. Referring specifically to the computer 1, a plurality of signal sources such as 5, 6 and 7 are shown representing the waveforms of absorbance spectra of reference chemicals $f_1$, $f_2$ to $f_n$. It will be understood that in such a computer system the library of signal sources would involve a very large number of elements or even certain compounds from which information may be drawn to determine the ratio of constituents in a particular unknown compound or mixture. Any suitable storage means may be provided to store the reference spectra and when a signal is required the waveform of the spectrum is reproduced for use in the computer operation. The signal waveforms produced by such sources as 5, 6 and 7 are applied to controls 8, 9 and 10 which may be in the form of attenuator devices or other form of signal amplitude controlling means to pass the signal waveform in the desired amplitude to the adder circuit 11.

In analyzing a particular composition it should be understood that the identities of the constituents of the composition must first be known so that the signal reference sources for those constituents may be selected for use in analyzing the ratio of its constituents.

The absorbance spectrum of a signal whose waveform characterizes the unknown composition may be fed directly from the spectrometer 2 through switch 3 to the subtractor circuit 12 or it may be applied from a previously obtained spectrogram from source 13. The controls such as 8, 9 and 10 are representative of the ones selected to determine the ratio of the constituents believed to be contained in the unknown. This selection may be manual by closing switches 8a, 9a and 10a. The sum of the outputs of attenuators 8, 9 and 10 is applied to the subtractor circuit 12 in comparison with the absorbance spectrum signal of the unknown and a difference signal is obtained. This difference signal may be viewed on a monitor cathode ray tube 14, the difference signal being also applied to correlators 15, 16 and 17. The spectrum signals from sources 5, 6 and 7 are also applied over circuits 18, 19 and 20 to the correlators 15, 16 and 17. The function of the correlators is to determine the error coefficients attributable to each of the concentration controls 8, 9 and 10 and then by feedback through circuits 21, 22 and 23 modify the attenuating characteristics of the controls. These error coefficients are obtained by correlating the difference spectrum $f-f$, where $f$ is the spectrogram signal of the unknown sample and $f$ is the spectrogram signal of the synthesized sample, with the individual constituent spectrum signal such as $f_1$, for example, whereby an instantaneous product $(f-f)f_1$ is obtained. The correlators also function as an integrator over a desired integration period and operate by means of the feedback circuits 21, 22 and 23 to change the controls 8, 9 and 10 by means of motors 24, 25 and 26 thus adjusting the constituent ratios for re-appraisal through the adder and subtractor circuits 11 and 12. This correlation-integration continues until the motors 24, 25 and 26 come to a standstill at which point the constituent values correspond on a linear basis close to the true ratios of the constituents in the unknown.

For further information on the details and theory of operation of the spectrogram analyzing computer 1 reference may be had to the copending application of H. G. Busignies, M. Rogoff and G. A. Deschamps, Serial No. 552,518, filed December 12, 1955, now Patent No. 2,866,899.

A cycle control 27 of known form is coupled to each of the motors 24, 25 and 26 and responds to the simultaneous quiescent conditions of the motors to apply a control signal to gates 28, 29 and 30 through which the output of the concentration controls 8, 9 and 10 are applied to the concentration computer 4. The concentration computer records the data received and determines the quantity of each constituent required to make a synthetic sample in accordance with the received information. This quantity control is applied over circuits 31, 32 and 33 to valves 34, 35 and 36 which control the feed of the constituent materials through ducts 37, 38 and 39 to a synthetic sample container or cell 40. The container 40 is suitably shaped and proportioned to receive a given minimum quantity for a sample to fill the cell portion 41 which is subjected to an infrared beam to obtain the absorbance spectrum of the sample. The container 40 is preferably provided with a vibrating device 42 which is operated as desired to suitably mix the ingredients required for the sample. The container 40, however, is adapted to receive additional quantities for correction purposes.

From the foregoing description it is readily apparent that the concentration computer 4 performs a rather simple computing operation that can be performed by any one of several known types of computers. The computer 4 first receives the ratio data of the unknown composition which was derived on a simultaneous linear basis by computer 1. This data is recorded and utilized to determine the quantity of each constituent required to synthesize a sample of a given volume. This concentration ratio data is converted by the computer to a time basis for controlling the length of time the valves 34, 35 and 36 are to be opened.

The dual-beam spectrometer 2 of known form is shown to have a source of infrared light 43 focused by means of mirrors 44 and 45 through the windows of the containers 40 and 46 containing the synthetic sample and the unknown, respectively. The absorbance spectra of the two beams are passed through a transmission filter 47 to detectors 48 and 49 which detect the voltage or temperature rise resulting from the portions of the beams passing through the two cells. The output of the two detectors is applied to a subtractor circuit which produces a signal corresponding to the waveform difference of the detector outputs. This difference absorbance spectrum signal may be viewed on a cathode ray tube 50, the spectrum signal being also applied over circuit 51 to the difference spectrum input 52 for the purpose of being analyzed in the computer 1.

The computer 1 now analyzes the difference spectrum received from the spectrometer 2 by using for comparison the same constituent reference spectra employed in analyzing the unknown composition. The controls 8, 9 and 10 are readjusted automatically by means of the correlators 15, 16 and 17 to obtain correction values or coefficients in accordance with the information contained in the difference spectrum. When the motors 24, 25 and 26 arrive at a quiescent state the cycle control 27 operates the gates 28, 29 and 30 to feed the correction data to the concentration computer 4. The computer 4 corrects the previously recorded data accordingly.

Where a synthetic sample is requird according to this corrected data, a new sample may be made in container 40 by removing the old sample and delivering new quantities of ingredients thereto or the computer 4 may be employed to utilize the previous sample and merely add ingredients thereto sufficient to form a new sample of larger volume having concentrations of ingredients according to the corrected ratios. The corrected amounts are applied to the container 40 which is vibrated to mix the ingredients and thereby present a corrected concentration of the sample in the cell portion 41. This corrected sample is compared with the unknown and the resulting difference, if any, detected on the cathode ray tube 50. If the difference is at all significant it will by its application over circuit 51 cause the computer 1 to re-cycle and determine new values for this difference spectrum which it passes on to the concentration computer 4 for readjustment of the values contained therein. This cyclic operation is performed one or more times as may be required until the difference spectrum is so minute that the result contained in the recording at computer 4 is sufficiently accurate for use as the true value of the ratios of the constituents contained in the unknown.

While we have described above the principle of our invention in connection with specific apparatus it is to be clearly understood that this description is made only by way of example and not as a limitation to the scope of our invention as set forth in the objects thereof and in the accompanying claims.

We claim:

1. An electronic spectroanalyzer system for determining the ratio of the quantities of the constituents in a given composition in which the identities of the constituents are known, comprising a spectrogram analyzing computer having a plurality of constituent refernece spectrograms for comparing the spectrogram of said composion with refrence spectrograms of said constituents to determine the approximate ratio of the quantities of said constituents present in said composition in terms of a linear combination of the constituents thereof, means included in said computer to translate respectively each of said spectrograms into an electrical signal whose waveform is representative thereof to effect the operations of said computer, means for synthesizing a sample mixture of said constituents in accordance with said approximate ratio, means for comparing the spectra of said given composition and said sample mixture to obtain an electrical signal whose waveform characterizes a difference spectrum, means to apply said difference spectrum signal to said spectrogram analyzing computer for comparison with said spectrogram signals of said constituents to obtain a set of correction coefficients, and means to adjust said approximate ratio in accordance with said correction coefficients to obtain substantially the true ratio of said constituents in said composition.

2. An electronic spectroanalyzer system for determining the ratio of the quantities of the constituents in a given composition in which the identities of the constituents are known, comprising a spectrogram analyzing computer having a plurality of reference spectrograms of elements, means to select thte reference spectrograms of elements constituting constituents of said composition, means to translate respectively each of said spectrograms into an elcetrical signal whose waveform is representative thereof, means to combine the selected spectrogram signals to form a composite spectrogram signal for determining the approximate ratio of the quantities of said constituents present in said composition, means for synthesizing a sample mixture of said constituents in accordance with said approximate ratio, means for generating a spectogram signal of said mixture and for comparing it with the spectrogram of said composition to obtain a difference spectrogram signal, means to apply said difference spectrogram signal to said spectrogram analyzing computer for comparison with the spectrogram signals of said constituents to obtain a set of correction coefficients, and means to adjust said approximate ratio in accordance with said correction coefficients.

3. An electronic spectroanalyzer system for determining the ratio of the quantities of the constituents in a given composition in which the identities of the constituents are known, comprising a spectrogram analyzing computer having a plurality of constituents reference spectrograms for comparing the spectrogram of said composition with refrence spectrograms of said constituents to determine the approximate ratio of the quantities of said constituents present in said composition in terms of a linear combination of the constituents thereof, means included in said computer to translate respectively each of said spectrograms into an electrical signal whose waveform is representative thereof to effect the operations of said computer, a concentration computer, cycle control means to apply the approximate ratio data of said spectrogram analyzing computer to said concentration computer for synthesizing a sample mixture of said constituents in accordance with said approximate ratio, means for comparing the spectra of said composition and said sample mixture to obtain a differnece spectrum signal, and means to apply said difference spectrum signal to said spectrogram analyzing computer for comparison with the spectrogram signals of said constituents to obtain a set of correction coefficients, said cycle control means operating to apply said correction coefficients to said concentration computer to adjust the approximate ratio data contained therein.

4. An electronic spectroanalyzer system for determining the ratio of the quantities of the constituents in a given composition in which the identities of the constituents in a given composition in which the identities of the constituents are known, comprising a spectrogram analyzing computer having a plurality of constituent reference spectrograms for comparing the spectrogram of said composition with reference spectrograms of said constituents to determine the approximate ratio of the quantities of said constituents present in said composition in terms of a linear combination of the constituents thereof, means included in said computer to translate respectively each of said spectorgrams into an electrical signal whose waveform is representative thereof to effect the operations of said computer, means for synthesizing a sample mixture of said constituents in accordance with said approximate ratio, a dual-beam spectrometer for comparing the spectra of said composition and said sample mixture to obtain a difference spectrum signal, means to apply said difference spectrum signal to said spectrogram analyzing computer for comparison with said spectrogram signals of said constituents to obtain a set of correction coefficients, and means to adjust said approxmate ratio in accordance with said correction coefficients.

5. An electronic spectroanalyzer system for determining the ratio of the quantities of the constituents in a given composition in which the identities of the constitents are known, comprising a spectrogram analyzing computer having a library of reference spectrograms of a plurality of elements, means for selecting the reference spectrograms corresponding to said constituents, means included in said computer to translate respectively each of said spectrograms into an electrical signal whose waveform is representative thereof to effect the operations of said spectrogram computer, means to combine said selected spectrogram signals and compare the sum thereof with the spectrogram signal of said composition and correlators responsive to any difference to correct the selected reference spectrogram signals to determine the ratio of the quantities of the constituents in said composition in terms of a linear combination thereof, a concentration computer to record the ratio obtained and to compute the amounts of the constituents required to synthesize a mixture according to said ratio, a dual-beam spectrometer having a cell containing a specimen of said composition and a second cell for a sample mixture, means under control of said concentration computer to synthesize a sample mixture in said second cell in accordance with said ratio, means associated with said spectrometer to obtain a difference spectrum signal of the difference between the absorbance spectra of said composition and of said synthesized mixture, means to apply said difference spectrum signal to said spectrogram analyzing computer to determine the quantities of said constituents represented in said difference spectrum signal in terms of a linear combination of said constituents to obtain a set of correction coefficients, and means to apply the output of said spectrogram analyzing computer to said concentration computer to adjust the previously recorded ratio in accordance with said set of correction coefficients.

6. An electronic spectroanalyzer system for determining the ratio of the quantities of the constituents in a given composition in which the identities of the constituents are known, comprising a spectrogram analyzing computer having a library of reference spectrograms of a plurality of elements, means for selecting from said library the reference spectrograms corresponding to said constituents, means included in said computer to translate respectively each of said spectrograms into an electrical signal whose waveform is representative thereof to effect the operations of said spectrogram computer, means to combine the selected spectrogram signals and compare the sum thereof with the spectrogram signal of said composition to determine the ratio of the quantities of the constituents in said composition in terms of a linear combination thereof, a concentration computer to record the ratio obtained and to compute the amounts of the constituents required to synthesize a mixture according to said ratio, means under control of said concentration computer to synthesize a sample mixture in accordance with said ratio, means to compare the spectrum of said mixture with the spectrum of said composition to obtain a difference spectrum signal, means to apply said difference spectrum signal to said spectrogram analyzing computer to determine the quantities of said constituents represented in said difference spectrum signal in terms of a linear combination of said constituents to obtain a set of correction coefficients, and means to apply the output of said spectrogram analyzing computer to said concentration computer to adjust the previously recorded ratio in accordance with said set of correction coefficients.

7. An electronic spectroanalyzer system for determining the ratio of the quantities of the constituents in a given composition in which the identities of the constituents are known, comprising a spectrogram analyzing computer having a library of reference spectrograms of a plurality of elements, means for selecting the reference spectrograms corresponding to said constituents, means to generate a first signal having a waveshape representing the spectrogram of said composition, means to generate a plurality of second signals each having a waveshape representing one of the selected reference spectra, means to combine said second signals to obtain a composite spectrogram signal and to compare it with the spectrogram signal of said composition to determine the ratio of the quantities of the constituents in said composition in terms of a linear combination thereof, a concentration computer to record the ratio obtained and to compute the amounts of the elements required to synthesize a mixture according to said ratio, means under control of said concentration computer to synthesize a sample mixture in accordance with said ratio, means to compare the spectrum of said mixture with the spectrum of said composition to obtain a difference spectrum signal, means to apply said difference spectrum signal to said spectrogram analyzing computer to determine the quantities of said constituents represented in said difference spectrum signal in terms of a linear combination of said constituents to obtain a set of correction coefficients, and means to apply the output of said spectrogram analyzing computer to said concentration computer to adjust the previously recorded ratios in accordance with said set of correction coefficients.

8. A method for determining the ratio of the quantities of the constituents in a given composition wherein the identities of the constituents are known, comprising the steps of obtaining the absorbance spectrogram of said composition, obtaining the absorbance spectrograms of each of said known constituents, generating a first signal having a waveshape representative of the absorbance spectrogram of said composition, generating a plurality of second signals each having a waveshape representative of one of the absorbance spectrograms of said constituents, combining said plurality of second signals in various ratios to generate a composite spectrogram, comparing said composite spectrogram with the spectrogram of said composition and adjusting the values of said second signals to obtain the optimum ratio of the combination of said plurality of second signals which yields a composite spectrogram having a least-squared difference relative to the spectrogram of said composition, chemically synthesizing a mixture of said constituents in accordance with said optimum ratio, producing a difference absorbance spectrogram from the difference between the spectrograms of said composition and said chemically synthesized mixture, generating a third signal having a waveshape representative of said difference spectrogram, combining said plurality of second signals in a second ratio which has the least-squared difference relative to said third signal, and adjusting said optimum ratio by said second ratio to obtain substantially the true ratio of the constituents present in said composition.

References Cited in the file of this patent

UNITED STATES PATENTS

| | | |
|---|---|---|
| 2,063,140 | Allison | Dec. 8, 1936 |
| 2,462,995 | Ritzmann | Mar. 1, 1949 |
| 2,559,688 | Touvet | July 10, 1951 |
| 2,602,368 | Barnes | July 8, 1952 |

OTHER REFERENCES

Daly: "A spectrometer for the analysis of mixtures using cathode-ray tube presentation of absorption difference spectra," pages 308–315, Journal of Scientific Instruments, May 25, 1951. (Copy in Scientific Library of Patent Office.)